United States Patent [19]
Daase et al.

[11] Patent Number: 5,822,422
[45] Date of Patent: Oct. 13, 1998

[54] METHOD AND APPARATUS FOR CONTROLLING AN EXCHANGE

[75] Inventors: Detlef Daase, Berlin; Karl-Heinz Legat, Renningen; Bernd Stahl, Stuttgart, all of Germany

[73] Assignee: Alcatel N.V., Netherlands

[21] Appl. No.: 710,812

[22] Filed: Sep. 23, 1996

[30] Foreign Application Priority Data

Sep. 30, 1995 [DE] Germany ................ 195 36 650.6

[51] Int. Cl.$^6$ .................................................. H04M 3/00
[52] U.S. Cl. .......................... 379/269; 379/201; 379/242; 395/682
[58] Field of Search ................... 379/201, 202, 379/219, 242, 112, 268, 269; 395/680, 682, 670, 671

[56] References Cited

U.S. PATENT DOCUMENTS

| | | | |
|---|---|---|---|
| 4,949,373 | 8/1990 | Baker, Jr. et al. | 379/202 |
| 4,993,017 | 2/1991 | Bachinger et al. | 370/360 |
| 5,473,680 | 12/1995 | Porter | 379/265 |
| 5,506,988 | 4/1996 | Weber et al. | 395/673 |
| 5,647,056 | 7/1997 | Barrett et al. | 379/412 |

FOREIGN PATENT DOCUMENTS

| | | |
|---|---|---|
| 0333123 | 9/1989 | European Pat. Off. . |
| 0463207 | 1/1991 | European Pat. Off. . |

OTHER PUBLICATIONS

S. Das, et al., "ITT 1240 Digital Exchange—Hardware Description," in *Electrical Communication*, vol. 56, No. 2/3, pp. 135–147 (ITT Corp., Essex, England, Jan. 1, 1982).

L. Katzschner, et al., "ITT 1240 Digital Exchange—Software Concepts and Implementation," in *Electrical Communication*, vol. 56, No. 2/3, pp. 173–183 (ITT Corp., Essex, England, Jan. 1, 1982).

Nick Skaperda, Siemens AG, "EWSD morgen—zukunftsichere Kommunikation," [EWSD Tomorrow: Future-assured Communication], in *Telcom Report*, vol. 11, Issue 6, pp. 204–209 (1988).

R. Thiele & A. Topp, Siemens AG, "Private Netze effectiver betrieben," [Operating Private Networks More Effectively with the Hicom Network Management Center (NMC), a new tool for comprehensive network management of private telecommunications networks], in *Telecom Report*, vol. 12, Issue 5, pp. 168–171 (1989).

"Electrical Communication", vol. 56, No. 2/3, 1981 by S. Das et al., pp. 135–147.

*Primary Examiner*—Harry S. Hong
*Assistant Examiner*—Scott Wolinsky
*Attorney, Agent, or Firm*—Ware, Fressola, Van Der Sluys & Adolphson LLP

[57] ABSTRACT

A method of controlling an exchange (NE), and a communications system which comprises at least one such exchange (NE) and a management system (OS). The exchange (NE) is controlled by a number of application programs. The application programs are assigned to two different control units (CONTR1; CONTR2), namely a first and a second control unit (CONTR1; CONTR2), with different operating system platforms. One part of the application programs runs on an operating system platform of the first control unit (CONTR1), which is specifically adapted for the performance of switching functions. The other part of the application programs which is assigned to the second control unit (CONTR2), runs on a universal operating system platform. In this case the application programs of the first control unit (CONTR1) cooperate with the application programs of the second control unit (CONTR2) to provide switching functions.

14 Claims, 4 Drawing Sheets

METHOD AND APPARATUS FOR CONTROLLING AN EXCHANGE

TECHNICAL FIELD

The invention concerns a method of controlling an exchange by a plurality of application programs, wherein some of the application programs run on an operating-system platform contained in a first control unit and specifically adapted for the performance of switching functions.

The invention is also directed to an exchange comprising a switching network and a control facility which is provided with a plurality of application programs for controlling an exchange and with a first control unit containing an operating-system platform specifically adapted for the performance of switching functions.

The invention is still further directed to a communications system comprising a management system and a plurality of exchanges connected to the management system.

BACKGROUND OF THE INVENTION

Two basic types of exchanges have been developed over time. On the one hand there are exchanges with a centralized control architecture, and on the other hand there are exchanges with a distributed control architecture.

An exchange with a centralized control is described for example in the article "EWSD tomorrow-future-assured communication" from the magazine "telcom report", volume 11, issue 6, 1988 by Nick Skaperda.

The centralized control exchange contains a digital switching network, linkage arrays for connecting subscribers and a central coordination processor. The switching functions of the exchange are hereby provided by group processors in the linkage arrays and by the central coordination processor. The latter is a very efficient multiprocessor system which performs the more centralized controlling and switching functions. Both the group processors and the coordination processor are computer systems that were specifically developed for the particular requirements of an exchange. Together with a special operating system, they form a system platform for the application software which is written in the programming language CHILL, the programming language for switching functions of the CCITT.

An exchange with a distributed control architecture is described for example in the article "ITT 1240 Digital Exchange—Software Concepts and Implementation" by L. Katzschner et al., in *Electrical Communication*, Vol. 56, No. 2/3, pp. 173–183, 1981.

The distributed control exchange comprises a digital switching network and a number of computer modules used to connect subscribers and control the exchange. The computer modules operate with a distributed real time operating system specifically developed for the requirements of an exchange, which manages a number of software modules. These software modules are also written in the programming language CHILL and are distributed via the computer modules. Their cooperation provides the switching functions of the exchange.

Both types of exchanges have the problem that the control of functions to be provided becomes more and more extensive and complex. One the one hand this places higher requirements on the computer output of the controllers, and on the other hand it results in a higher software development cost.

SUMMARY OF THE INVENTION

The invention now has the task of reducing the cost of controlling exchanges. The task is fulfilled by a method of controlling an exchange wherein the application programs are assigned to two different control units, namely a first control unit and a second control unit, with different operating-system platforms, that the application programs of the second control unit run on a universal operating-system platform, and that application programs of the first control unit cooperate with application programs of the second control unit in performing switching functions.

The task is also fulfilled by an exchange wherein the application programs are assigned to two different control units, namely a first control unit and a second control unit, that the second control unit is provided with a universal operating-system platform, and that application programs of the two control units are designed to be executable on the respective operating-system platform and cooperate with application programs of the respective other control unit in performing switching functions.

The task is still further fulfilled by a communications system wherein at least one of the exchanges is as recited above, and that the management system is connected to this exchange via the second control unit.

The invention is based on the knowledge that the development and testing cost of programs managed by a universal operating system is considerably lower.

The basic idea of the invention is to build the control of an exchange with two different control units, one of which is based on a universal operating system platform and the other on an operating system platform that is specifically adapted for the performance of switching functions. The exchange functions are provided by application programs which are assigned to the one or the other operating system platform and run on this platform. Application programs of both control units cooperate to provide switching functions.

The invention has the advantage that the complexity of the application programs is reduced, because not all application programs need to run on a platform specifically adapted for the performance of switching functions. This makes it possible to assign to such a platform only those application programs or program parts which really need this special program environment.

This also reduces the requirements on the computer output of the control unit, particularly the control unit of the controller that is based on the specifically adapted platform. In this case it must be taken into account that the provision of a computer output is more favorable on a universal operating system platform than its provision on a specialized proprietary system platform.

Another advantage of the invention is that a large number of premanufactured program modules are available for such universal operating system platforms, which can also be used for the control functions of exchanges. This considerably reduces the development and testing cost.

Further advantages of the invention result in regard to the connection of the exchange to the network management system. As a rule, network management systems are based on universal system platforms.

In this case a system platform is formed of a computer system and the pertinent operating system platform.

Now, if at least part of the exchange is based on the same system platform, it simplifies the interface with the management system considerably, which now functions between two similar system platforms. In addition, it enables the use of a number of hardware and software products that are available for universal application data processing. Such products in particular make it possible to considerably enlarge the available bandwidth for communication between the exchange and the management system.

BRIEF DESCRIPTION OF THE DRAWINGS

The invention will be explained in greater detail in the following by means of two configuration examples with the aid of the attached drawings.

BEST MODE FOR CARRYING OUT THE INVENTION

The method of the invention for controlling an exchange is described in the first configuration example by means of an exchange of the invention which is part of a communications system of the invention.

Figure 1:
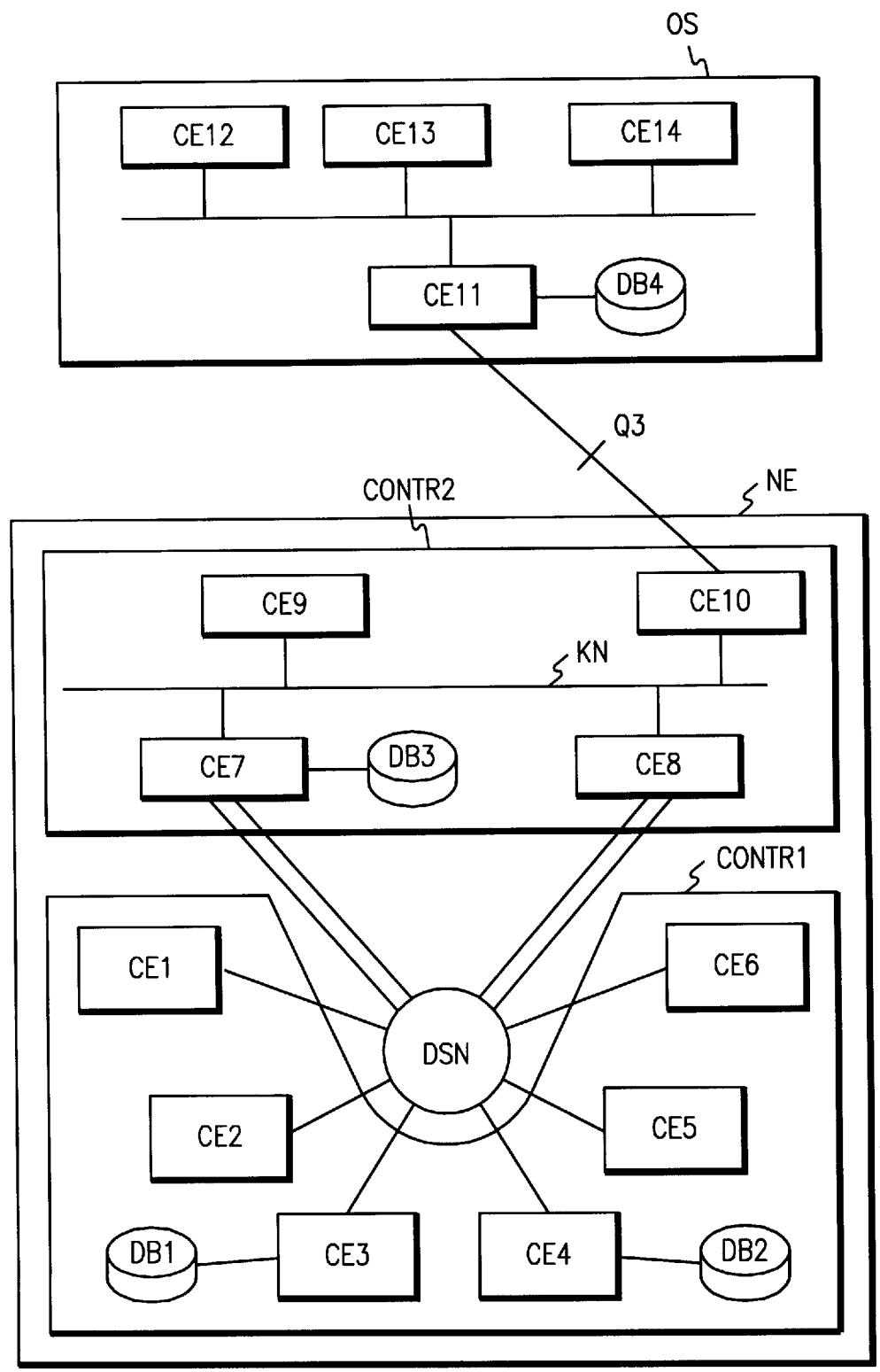
FIG. 1 is a block diagram of a communications system of the invention with an exchange of the invention for a first configuration example.

FIG. 1 illustrates an exchange NE and a management system OS which are interconnected.

The management system OS is used to service, manage and maintain the exchange NE and a number of other exchanges which are not illustrated here. It is connected to the exchange NE via an interface Q3, which corresponds to the Q3 standard according to the OSI (Open System Interconnection) layer model. It is also possible to use another interface, preferably one that is standardized as well. Such interfaces are for example interfaces which correspond to the Q1 or Q2 standard.

The exchange NE is a telephone exchange. It is also possible for the exchange NE to be a different kind of exchange, which is used to switch data. Such exchanges are for example cross-connectors, multiplexers, but also bridges or routers for data networks.

The exchange NE comprises a switching network DSN, a communications network KN, 10 computer systems CE1 to CE10 and three data bases DB1 to DB3. The computer systems CE1 to CE6 and the data bases DB1 and DB2 form a control unit CONTR1. The computer systems CE7 to CE10, the data base DB3 and the communications network KN form a control unit CONTR2. The computer systems CE1 to CE8 interchange data via the switching network DSN. The computer systems CE7 to CE10 are interconnected via the communications network KN and the computer system CE10 is connected to the management system OS.

The switching network DSN is the usual digital switching network for exchanges. It is controlled by the control units CONTR1 and CONTR2 and is used to both switch connections for subscribers linked to the exchange NE, and as a medium for communication between the computer systems CE1 and CE8.

It is also possible to use an independent communications network for the communication between the computer systems CE1 to CE10. A suitable communications network would be for example a LAN (Local Area Network) with an ethernet or token access protocol.

The computer systems CE1 to CE6 of control unit CONTR1 are computer systems designed to provide telecommunication functions. Their construction can be found for example in the article "ITT 1240 Digital Exchange—Hardware Description" by S. Das, et al., in *Electrical Communication*, Vol. 56, No. 2/3, pp. 135–147, 1981, or in other articles of this volume.

The computer systems CE1 and CE2 are used to fulfill rather decentralized tasks, for example for subscriber stations connections or to signal subscriber stations. The computer systems CE3 to CE6 fulfill centralized tasks, for example linkage control or the control of call charge registrations. The number of computer systems CE1 to CE6 is chosen as an example.

It is furthermore possible to use a single very efficient computer system instead of the computer systems CE3 and CE4, which performs all the centralized tasks of control unit CONTR1. Also a multi-stage hierarchy of computer systems is possible for ever more centralized tasks. This allows the control unit CONTR1 to have a central or a distributed control architecture.

The computer systems CE7 to CE10 of control unit CONTR2 are conventional universal computer systems. They each have one or more processors, an internal computer bus, a central memory, at least one mass memory and modules for exchanging data via the communications network KN, i.e. via an ethernet card in each instance. In addition the computer system CE10 has modules for exchanging data with the computer system CE11, for example an ethernet, FDDI or ISDN card. Beyond that, the computer systems CE7 and CE8 have modules which enable them in each instance to establish up to two communications channels in the switching network DSN. In this case it is possible to equip the computer systems CE7 and CE8 with any number of such modules in order to increase to any degree the bandwidth available for the exchange of information between the control units CONTR1 and CONTR2.

The communications network KN comprises a bus via which the computer systems CE7 to CE10 intercommunicate by means of an ethernet access protocol. Other communications networks which are suited for computer-to-computer communication can be used instead of communications network KN.

The number of computer systems CE7 to CE10 is chosen as an example. However, at least one such computer system is required. In that case the communications network KN would be omitted. The data bases DB1 to DB3 are mass memories, for example hard disk drives with a high storage capacity.

The management system OS has four computer systems CE11 to CE14 which are interconnected by a communications network, and a data base DB4. The computer system CE11 can access the data base DB4 and is connected to the exchange NE via interface Q3.

The computer systems CE11 to CE14 and the data base DB4 are constructed like the computer systems CE7 and CE8 or the data bases DB1 to DB3. Application programs, which perform network management functions for the network element NE and for other exchanges, run on the hardware platform formed by them.

The network management functions for the exchange NE are provided by programs which run on computer systems CE11 to CE14 of the management system OS. The control units CONTR1 and CONTR2 cooperate to control the exchange NE and in this way provide the switching functions of the exchange. The computer systems of the control unit CONTR1 are special computer systems designed to provide switching functions, which operate with an equally special driver system. The computer systems of the control unit CONTR2 are universal computer systems that operate with a corresponding universal operating system.

The functional construction and the interaction of the control units CONTR1 and CONTR2 will now be explained by means of FIG. 2.

Figure 2:
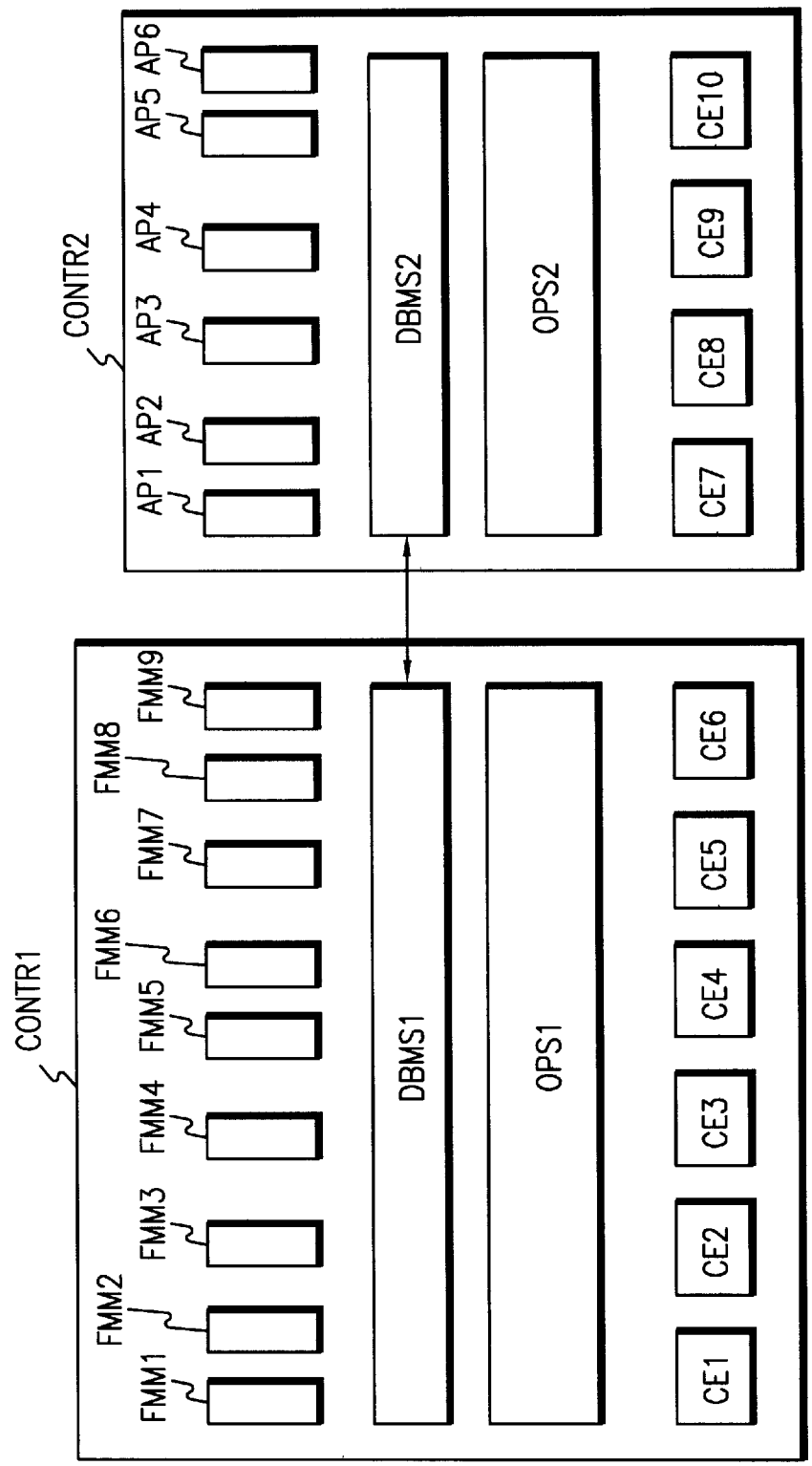
FIG. 2 is a functional representation of the communications system of the invention in FIG. 1.

FIG. 2 illustrates the control units CONTR1 and CONTR2, which interchange data. Control unit CONTR1 has the computer systems CE1 to CE6 as a hardware base, an operating system OPS1, a data base DBMS1 and nine application programs FMM1 to FMM9.

The operating system OPS1 and the computer systems CE1 to CE6 provide a common system platform for the application programs FMM1 to FMM9, where the application programs FMM1 to FMM9 run on an operating system platform formed by the operating system OPS1.

In this case the operating system OPS1 is a distributed real time operating system specifically designed to provide the functions needed to control an exchange. The operating system OPS1 manages the effect of the application programs FMM1 to FMM9 on the computer systems CE1 to CE9, and to that end particularly determines the sequence of its execution, starts it and determines the condition of the run. In addition it provides standard services, which particularly provide the transportation of data between the application programs FMM1 to FMM9 and the devices of the computer systems CE1 to CE6, and between the application programs FMM1 to FMM9. Furthermore, during the simultaneous running of several of the application programs FMM1 to FMM9, it coordinates the access to common operating means.

In this case a part of an operating system runs in each of the computer systems, which provides the operating system functions needed there.

It is also possible for the operating system OPS1 not to be a distributed operating system. This is particularly the case when the control unit CONTR1 comprises a single very efficient computer system.

The data base DBMS1 manages a part of the data needed by the application programs FMM1 to FMM9, for example semipermanent variables or data files. The data base DBMS1 is a distributed data base which is specifically designed for the requirements in an exchange. In this case the data are stored in the data bases DB1 and DB2 of computer system CE3 or CE4. Access to these data by each of the application programs FMM1 to FMM9 can be obtained by means of special commands directed to the data base DBMS1. It is also possible to omit the availability of such a distributed data base.

The application programs FMM1 to FMM9 provide the switching functions of the control unit CONTR1 and to that effect cooperate with each other and with control unit CONTR2. These are programs in real time implementation, which are written in the programming language CHILL and perform their functions in real time in accordance with the concept of virtual machines.

The number of application programs and their distribution to the computer system CE1 to CE6 is chosen as an example. The functions provided by the application programs FMM1 to FMM9 and the cooperation of the application programs FMM1 to FMM9 can be found for example in the article "ITT 1240 Digital Exchange—Software Concepts and Implementation" by L. Katzschner et al., in *Electrical Communication*, Vol. 56, No. 2/3, 1981.

The control unit CONTR2 comprises computer systems CE7 to CE10 as the hardware base, an operating system OPS2, a data base DBMS2 and six application programs AP1 to AP6.

The operating system OPS2 and the computer systems CE7 to CE10 provide a universal system platform for application programs AP1 to AP6. This means that the operating system OPS2 is an operating system for universal computers whose mode of operation and interfaces are known, so that application programs and program modules that were developed for universal computers are able to run on this operating system platform built by the operating system OPS2.

The operating system OPS2 is a distributed non-real time operating system, for example a Unix version, which runs in several computer systems. Like operating system OPS1, the operating system OPS2 manages and supports the running of application programs AP1 to AP6, and particularly provides a number of standard services to them.

It is also possible for the operating system OPS2 not to be a distributed operating system. It is possible for each one of computer systems CE7 to CE10 to have an independent network-capable operating system. The functions available in such operating systems would also enable the application programs AP1 to AP6 to cooperate, and in that case an interconnected system, platform would also be created for these application programs.

The data base DBMS1 is a conventional universally applicable data base, for example according to the SQL standard. Such a data base is for example the data base sold under the name of ORAKEL. Like data base DBMS1, data base DBMS2 manages central data for application programs AP1 to AP6, which are stored in the data base DB3.

The application programs AP1 to AP6 carry out the functions to be provided by control unit CONTR2 and to that effect cooperate with each other and with application programs of the control unit CONTR1. The application programs AP1 to AP6 are written in the programming language C++. It is also possible for them to be written in another conventional language designed for universal applications.

It is advantageous in this case to use a number of standard program modules in application programs AP1 to AP6. Large numbers of such program modules are available for programs written in a universal programming language and which run on a universal platform.

The switching functions are provided by control units CONTR1 and CONTR2 as follows: the control unit CONTR1 is responsible for performing standard switching tasks or basic switching tasks in real time. The individual tasks are fulfilled by running the application programs FMM1 to FMM9.

The control unit CONTR2 is responsible for providing complex switching functions and for connecting the management system OS. In this case the task of such switching functions comprises for example providing ISDN features, centrex services, call charge registrations or applications or services for mobile radio or for intelligent networks. These tasks are fulfilled by running the application programs AP1 and AP2 via computer systems CE1 to CE10.

In this case the connection of the management system OS is simplified in an advantageous manner. Both the computer system CE10 of control unit CONTR2 and the computer system CE11 of control unit CONTR2 of the management system OS are universal computer systems, so that a number of hardware products are available for the connection, such as for example LAN (Local Area Network) cards. Furthermore, since both have universal operating systems, thus the same type of operating systems, the use of a number of standard software products is possible for the higher communication layers. The interface with the management system OS extends practically inside the same platform.

To carry out their tasks, it is necessary for application programs FMM1 to FMM9 and application programs AP1 to AP6 to cooperate. In this case the cooperation takes place in part according to the client server principle: one of the application programs FMM1 to FMM9 places an order with the control unit CONTR2, which is carried out by running one of the application programs AP1 to AP6. Any potential result is then sent back by this application program to the application program which issued the order. For example, the application programs of control unit CONTR1 perform call-handling tasks or tasks that concern the provision of services, and in this way represent a call-handling server or a service server for the application programs of control unit CONTR2.

In this case it is particularly advantageous to let complex functions, which are not as time-critical, to be carried out by application programs of the control unit CONTR1. The cost of developing and testing application programs to fulfill such tasks is considerably less for application programs which run on the system platform of control unit CONTR2.

The cooperation of application programs of control units CONTR1 and CONTR2 requires that mechanisms be available for the exchange of messages and data between such application programs, in spite of the difference in system platforms.

To that end the control units CONTR1 and CONTR2 are interconnected datawise via the linkage of their data bases DBMS1 and DBMS2. Data which are required here by application programs FMM1 to FMM9 and AP1 to AP6 to fulfill their tasks are managed by the data bases DBMS1 and DBMS2. Such data are for example semipermanent variables of these application programs, subscriber data, data concerning the status of the switching network DSN, data regarding telecommunication services to be provided, or data regarding the traffic load of the exchange. This linkage of data bases DBMS1 and DBMS2, for example by means of a replication mechanism, makes these data available to both application programs FMM1 to FMM9 as well as application programs AP1 to AP6. Furthermore, such data are also managed by data bases DBMS1 and DBMS2, and are made visible in the other respective control unit, which changes the sequence or the result of application programs of the other respective control unit.

It is also possible to link control units CONTR1 and CONTR2 via other mechanisms. For example, it is possible for application programs to reciprocally exchange messages via special communication protocols, for example via FTP (File Transfer Protocol).

The communication mechanisms underlying the linkage of control units CONTR1 and CONTR2 will now be explained by means of the hardware and software structure of the computer system CE7.

Figure 3:
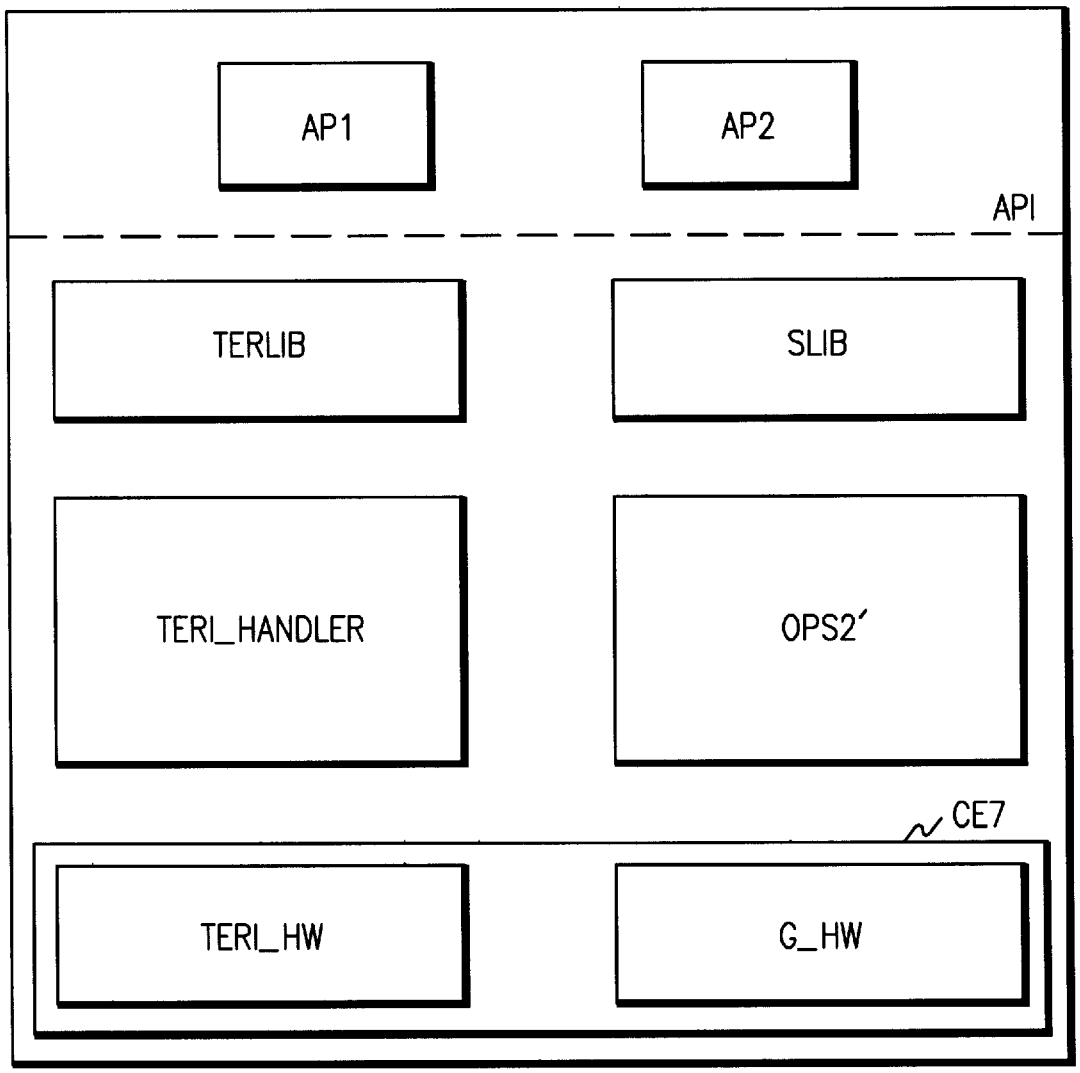
FIG. 3 is a functional representation of a computer system for the exchange of the invention in FIG. 1.

FIG. 3 illustrates the computer system CE7 with program modules TERI_HANDLER, OPS2', TERLIB and SLIB, and the application programs AP1 and AP2.

The computer system CE7 comprises two hardware modules TER_HW and G_HW. The hardware module G_HW is a group of modules forming a universal computer system. The hardware module TER_HW is a special group of modules for communication with computer systems CE1 to CE6 via the switching network DSN. Its construction corresponds to the respective communication modules in computer systems CE1 to CE6. The program module OPS2' is the operating part of operating system OS2, which runs in computer system CE7. The program module TERI_HANDLER is a device driver which makes possible the access to the hardware module TERI_HW. The program modules TERLIB and SLIB are program libraries which are available to the application programs AP1 and AP2. In this case the program module SLIB is a standard library for the operating system OSP2, and the program module TERLIB is a library of programs providing access functions to the hardware module TER_HW.

The application programs AP1 and AP2 utilize the functions provided to them by the program modules TERLIB, TERI_HANDLER, SLIB and OSP2', and in this way have access to these program modules via an interface API. Thus, they are able to utilize all the mechanisms and standard functions available to them through the universal operating system OSP2, as well as communicate with computer systems CE1 to CE6 by means of similarly constructed mechanisms and functions.

Another possibility for the hardware-wise linkage of control units CONTR1 and CONTR2 is illustrated by a second configuration example.

Figure 4:
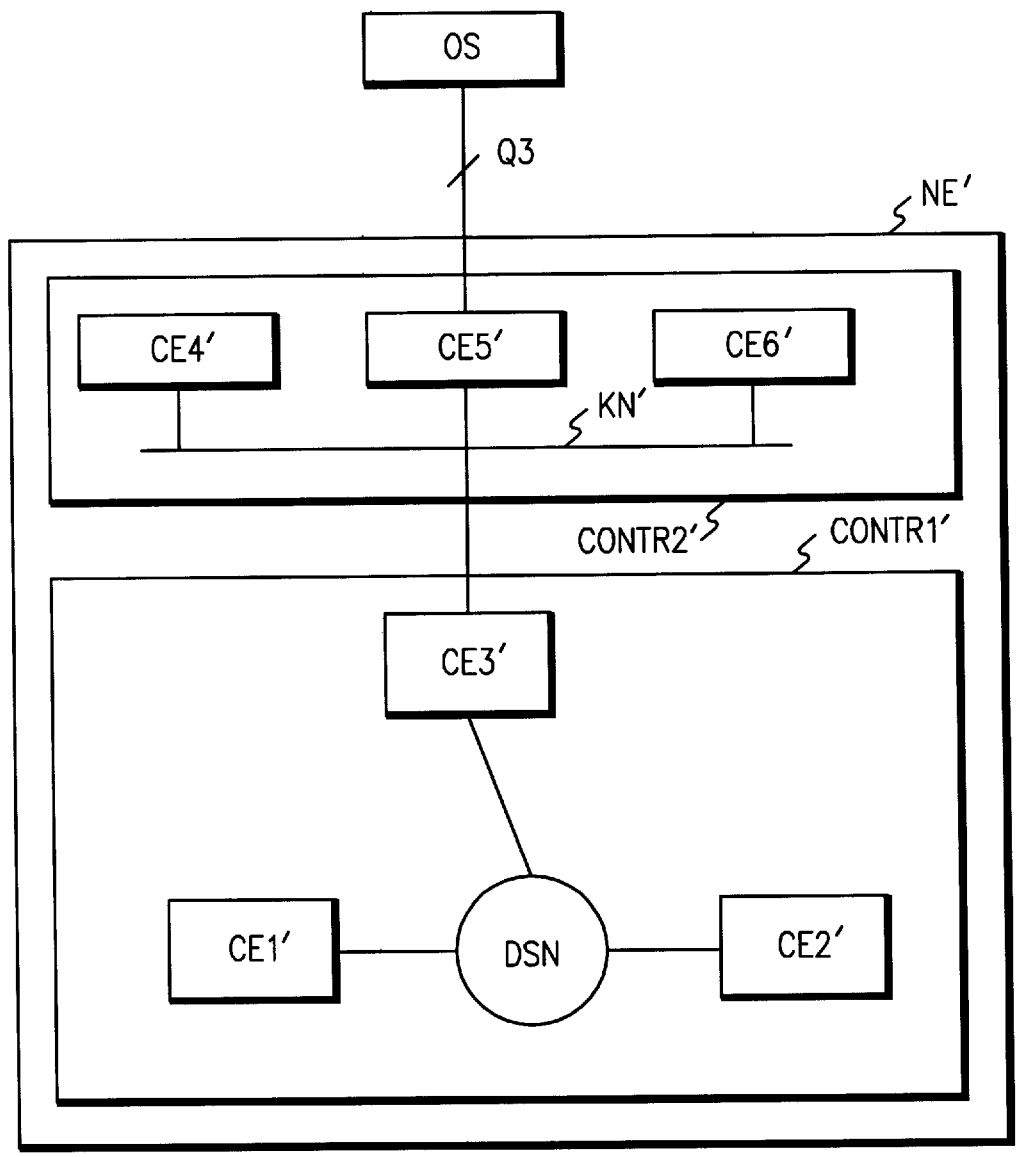
FIG. 4 is a block diagram of an exchange of the invention for a second configuration example.

FIG. 4 illustrates an exchange NE' which is linked to the management system OS via the interface Q3. The exchange NE' comprises a switching network DSN, six computer systems CE1' to CE6' and a communications network KN'. The computer systems CE1' to CE3' are interlinked via the switching network DSN, and the computer systems CE3' to CE6' are interlinked via the communications network KN'.

The computer systems CE1' to CE3' form a control unit CONTR1' and are configured like computer systems CE1 to CE6 in FIG. 1. The computer systems CE4' to CE6' and the communications network KN' form a control unit CONTR2' and are configured like computer systems CE7 to CE10 or like the communications network KN.

In contrast to the exchange NE in FIG. 1, in this case a special computer system, namely computer system CE3', is responsible for the communication of control unit CONTR1' with control unit CONTR2'. It is necessary to provide the computer system CE3' with corresponding units and software modules which enable it to communicate with computer systems CE4' to CE6', analogously to FIG. 3.

What is claimed is:

1. A method of controlling an exchange (NE) having a switching network (DSN) for interconnecting a plurality of subscribers, wherein the exchange (NE) is controlled by a plurality of application programs (FMM1 to FMM9 AP1 to AP6), and wherein some of the application programs (FMM1 to FMM9) run on an operating-system platform (OPS1) contained in a first control unit (CONTR1) and specifically adapted for the performance of switching of connections among said subscribers, characterized in that:

the application programs (FMM1 to FMM9; AP1 to AP6) are assigned to two different control units (CONTR1; CONTR2), namely the first control unit (CONTR1) and a second control unit (CONTR2), with different operating-system platforms (OPS1; OPS2), the application programs (AP1 to AP6) of the second control unit (CONTR2) run on a universal operating-system platform (OPS2), and the application programs (FMM1 to FMM9) of the first control unit (CONTR1) cooperate with application programs (AP1 to AP6) of the second control unit (CONTR2) in performing switching functions.

2. A method as claimed in claim 1, characterized in that application programs (FMM1 to FMM9; AP1 to AP6) of the first and second control units (CONTR1; CONTR2) cooperate on the client-server principle.

3. A method as claimed in claim 2, characterized in that application programs (AP1 to AP6) of the second control unit (CONTR2) function as service and call-handling servers for application programs (FMM1 to FMM9) of the first control unit (CONTR1).

4. A method as claimed in claim 1, characterized in that the first and second control units (CONTR1, CONTR2) are interconnected datawise.

5. A method as claimed in claim 4, characterized in that a data base each (DBMS1, DBMS2) is provided for the first and the second control unit, that the data bases (DBMS1, DBMS2) are linked and that application programs (AP1 to AP6) of the second control unit (CONTR2) access data of the first control unit (CONTR1) via this linkage of data bases (DBMS1, DBMS2).

6. A method as claimed in claim 1, characterized in that access is made possible from the second control unit (CONTR2) to all relevant data of the first control unit (CONTR1), and the first control unit (CONTR1) thereby forms an open system.

7. A method as claimed in claim 1, characterized in that network management functions are processed by the application programs (AP1 to AP6) of the second control unit (CONTR2).

8. An exchange (NE) comprising a switching network (DSN) for interconnecting a plurality of subscribers, and a control facility which is provided with a plurality of application programs (FMM1 to FMM9 AP1 to AP6) for controlling the exchange (NE) and with a first control unit (CONTR1) containing an operating-system platform (OPS1) specifically adapted for the performance of switching of connections among said subscribers, characterized in that:

the application programs (FMM1 to FMM9; AP1 to AP6) are assigned to two different control units (CONTR1; CONTR2), namely the first control unit (CONTR1) and a second control unit (CONTR2), the second control unit (CONTR2) is provided with a universal operating-system platform (OPS2), and the application programs (FMM1 to FMM9; AP1 to AP6) of the two control units (CONTR1; CONTR2) are each designed to be executable on a respective one of said operating-system platforms (OPS1; OPS2) and cooperate with application programs (FMM1 to FMM9; AP1 to AP6) of the respective other control unit (CONTR1; CONTR2) in performing switching functions.

9. An exchange (NE) as claimed in claim 8, characterized in that the first control unit (CONTR1) comprises one computer system or two or more interconnected computer systems (CE1 to CE6, CE7 to CE10), and that the second control unit (CONTR2) comprises one computer system or two or more interconnected computer systems (CE1 to CE6, CE7 to CE10).

10. An exchange (NE) as claimed in claim 9, characterized in that the computer systems (CE1 to CE6) of the first control unit (CONTR1) are specifically adapted for the performance of switching functions, and that the computer systems (CE7 to CE10) of the second control unit (CONTR2) are universal computer systems.

11. An exchange (NE) as claimed in claim 9, characterized in that the computer systems (CE1 to CE6) of the first control unit (CONTR1) and at least one computer system (CE7, CE8) of the second control unit (CONTR2) are interconnected via a communications network (DSN).

12. An exchange (NE') as claimed in claim 9, characterized in that at least one (CE3') of the computer systems of the first control unit (CONTR1') is provided with an interface device for interfacing with the second control unit (CONTR2').

13. A communications system comprising a management system (OS) and a plurality of exchanges connected to the management system (OS), characterized in that at least one of the exchanges (NE) comprises a switching network (DSN) and a control facility which is provided with a plurality of application programs (FMM1 to FMM9; AP1 to AP6) for controlling said exchange (NE) and with a first control unit (CONTR1) containing an operating-system platform (OPS1) specifically adapted for the performance of switching functions, wherein the application programs (FMM1 to FMM9; AP1 to AP6) are assigned to two different control units (CONTR1; CONTR2), namely the first control unit (CONTR1) and a second control unit (CONTR2), that the second control unit (CONTR2) is provided with a universal operating-system platform (OPS2), and that application programs (FMM1 to FMM9; AP1 to AP6) of the two control units (CONTR1; CONTR2) are each designed to be executable on a respective one of said operating-system platforms (OPS1; OPS2) and cooperate with application programs (FMM1 to FMM9; AP1 to AP6) of the respective other control unit (CONTR1; CONTR2) in performing switching functions; and that the management system (OS) is connected to said exchange (NE) via the second control unit (CONTR2).

14. A communications system as claimed in claim 13, characterized in that the management system (OS) and the second control unit (CONTR2) are provided with like operating-system platforms.

* * * * *